United States Patent
Madhav

(10) Patent No.: US 11,556,019 B1
(45) Date of Patent: Jan. 17, 2023

(54) VIEWING PROTECTION SYSTEM FOR LASER THREATS AGAINST AIRCRAFT

(71) Applicant: Jagdish T. Madhav, Bothell, WA (US)

(72) Inventor: Jagdish T. Madhav, Bothell, WA (US)

(*) Notice: Subject to any disclaimer, the term of this patent is extended or adjusted under 35 U.S.C. 154(b) by 334 days.

(21) Appl. No.: 16/691,584

(22) Filed: Nov. 21, 2019

Related U.S. Application Data

(63) Continuation of application No. 15/880,509, filed on Jan. 25, 2018, now Pat. No. 10,520,755.

(51) Int. Cl.
  *G02C 7/10* (2006.01)
  *G02C 9/04* (2006.01)
  *G02C 7/08* (2006.01)

(52) U.S. Cl.
  CPC ............ *G02C 7/104* (2013.01); *G02C 7/086* (2013.01); *G02C 9/04* (2013.01)

(58) Field of Classification Search
  CPC .......... G02C 7/104; G02C 7/086; G02C 9/04
  USPC .............................................. 351/41, 44, 47
  See application file for complete search history.

(56) References Cited

U.S. PATENT DOCUMENTS

| | | | | |
|---|---|---|---|---|
| 4,869,584 | A | * | 9/1989 | Dion ......................... G02C 7/16 351/158 |
| 4,953,231 | A | * | 9/1990 | Burnett .................... G02C 7/16 351/158 |
| 6,869,180 | B1 | * | 3/2005 | Kidouchim .............. G02C 9/00 351/57 |
| D586,840 | S | * | 2/2009 | Wilkerson ................... D16/326 |
| D590,868 | S | * | 4/2009 | Wilkerson ................... D16/301 |
| 7,771,045 | B2 | * | 8/2010 | Matera ............ B29D 11/00634 264/1.32 |

* cited by examiner

*Primary Examiner* — Tuyen Tra

(57) ABSTRACT

Provided is a selectively filtered vision protection system for defense against aircraft laser threats. The system comprises a viewing device having a frame supporting a transparent viewing surface. The frame is configured to be positioned on the face of a user such that the user may see through the viewing surface. A selective filter is positioned adjacent to the viewing surface such that the angle of the field of view of the user is regulated in at least one orthogonal plane. The viewing angle is selected to prevent light transmitted from a light source, located outside of the viewing angle, from being viewed by the user. The selective filter is configured to operate in a first mode for transmitting light unrestricted through the viewing surface, and a second mode to regulate the angle of the field of view of the user in at least one orthogonal plane.

20 Claims, 14 Drawing Sheets

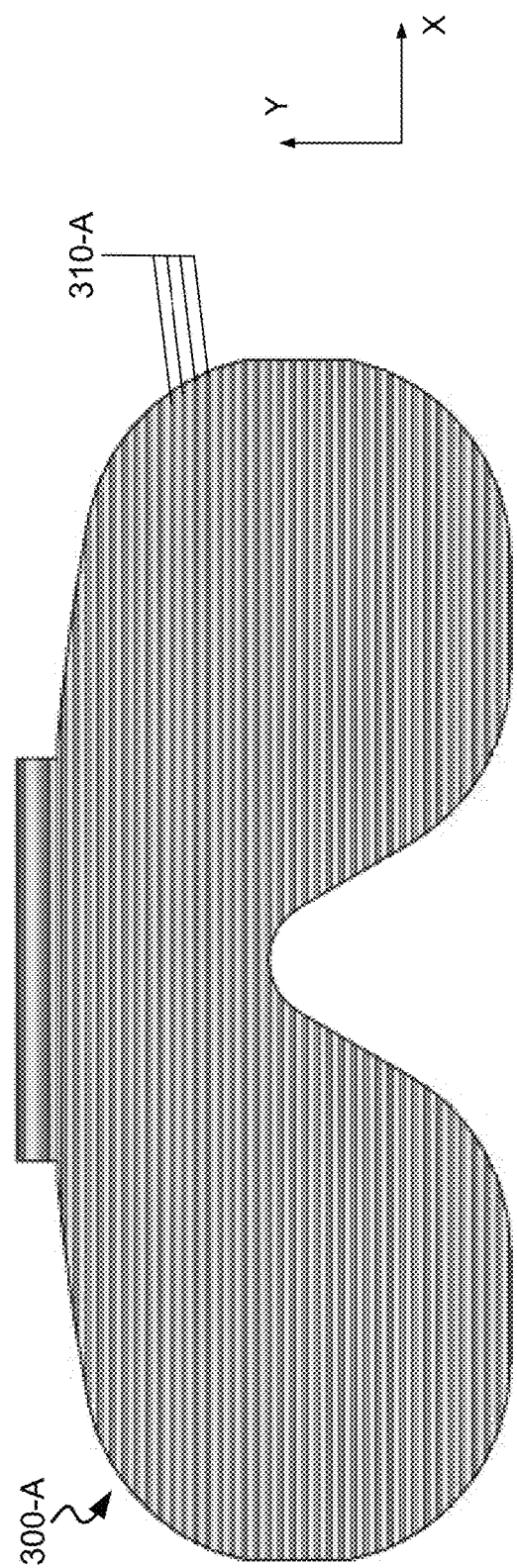
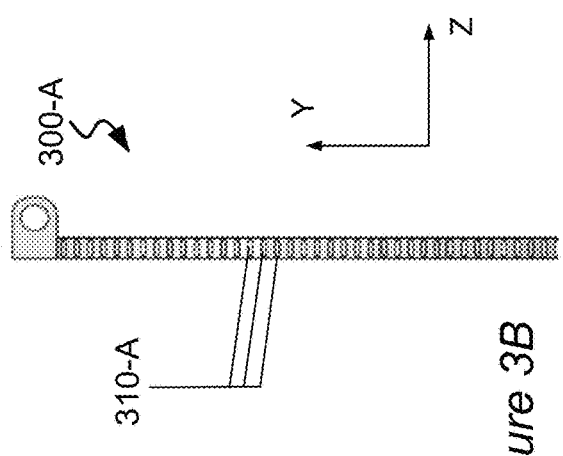
Figure 3A
Figure 3B

VIEWING PROTECTION SYSTEM FOR LASER THREATS AGAINST AIRCRAFT

CROSS-REFERENCE TO RELATED APPLICATIONS

This application is a continuation of U.S. patent application Ser. No. 15/880,509 entitled: "VIEWING PROTECTION SYSTEM FOR LASER THREATS AGAINST AIRCRAFT" filed on Jan. 25, 2018, which is incorporated herein by reference in its entirety for all purposes.

BACKGROUND

Widespread availability of low-power light sources (e.g., laser pointers, spotlights, searchlights) and other sources of concentrated light led to many recent attacks on aircraft, particularly near airports and high air traffic areas. These attacks may cause harm to pilots and, in some cases to, aircraft. The most likely scenario is when a bright visible laser light causes distraction or temporary flash blindness to a pilot, during a critical phase of flight such as landing or takeoff. Such risk is greatest when the exposure comes during critical phases of flight with high workload: takeoff, approach, landing, and critical or emergency maneuvers. It is also possible that a visible or invisible beam could cause permanent harm to a pilot's eyes. Most attacks happen when aircraft are at low altitudes. Light sources are typically positioned on the ground.

While existing legal mechanisms are designed to heavily penalize laser attackers and other similar attackers, these mechanisms have not been effective in discouraging these individuals, and unfortunately the frequency and severity of attacks continue to rise. Other regulatory measures and restrictions are difficult to implement and have not proved effective against intentional, as well as accidental, shining of lights towards aircraft.

Thus, there exists a need for improved systems and apparatuses for minimizing the harmful effects of lights sources aimed at an aircraft to the pilots of such aircraft.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided is a selectively filtered protection system for defense against aircraft laser threats. The system comprises a viewing device has a frame supporting a transparent viewing surface. The frame is configured to be positioned on the face of a user such that the user may see through the viewing surface. The system further comprises a selective filter positioned adjacent to the viewing surface such that light is transmitted through the privacy filter to the user. The privacy filter regulates the angle of the field of view of the user in at least on orthogonal plane. The viewing angle is selected to prevent light transmitted from a light source from being viewed by the user. The light source is located outside of the viewing angle.

The privacy filter may be a light cover having mechanical louvers. The viewing angle may be between about 40° and about 60°.

The privacy filter may be configured to operate in a first mode and a second mode. In the first mode, light is transmitted unrestricted through the viewing surface to the user. In the second mode, the selective filter regulates the angle of the field of view of the user in at least one orthogonal plane, The frame comprises a fixed bridge portion that is configured to extend across the forehead of the user. The selective filter may be coupled to a hinge mechanism that is pivotably coupled to the fixed bridge portion such that the hinge mechanism may be alternated between a first mode in which the selective filter is positioned adjacent to the viewing surface, and a second mode in which the selective filter is not positioned adjacent to the viewing surface.

The user may be a pilot within the cockpit of an aircraft. The system may further comprise a detection module for detecting an output from the light source. The light source is positioned outside of the aircraft. Detecting the output from the light source may generate a first signal that is transmitted to the hinge mechanism to move into the first position. Detecting no output from the light source may generate a second signal that is transmitted to the hinge mechanism to move into the second position, The system may further operate in a restricted mode and a landing mode corresponding to a landing phase of operation of the aircraft. In the restricted mode, the hinge mechanism remains in the second mode. In the landing mode, the hinge mechanism alternates between the first mode and the second mode. Also provided is an aircraft comprising a selective filter viewing protection system for defense against aircraft laser threats, as described above.

Also provided is a selective filter vision protection system for defense against aircraft laser threats. The system may comprise a viewing device having a frame supporting a viewing surface. The frame is configured to be positioned on the face of a user such that the user may see through the viewing surface. The viewing surface comprises a selective filter such that light is transmitted through the selective filter to the user. The selective filter regulates the angle of the field of view of the user in at least one orthogonal plane. The viewing angle is selected to prevent light transmitted from a light source from being viewed by the user. The light source is located outside of the viewing angle. The selective filter may be a light cover having mechanical louvers. The viewing angle is between about 40° and about 60°.

The viewing surface may be configured to operate in a first mode and a second mode. In the first mode, light is transmitted unrestricted through the selective filter to the user. In the second mode, the selective filter regulates the angle of the field of view of the user in at least one orthogonal plane. The viewing surface may operate in the second mode during the landing phase of operation of an aircraft.

These and other embodiments are described further below with reference to the figures.

BRIEF DESCRIPTION OF THE DRAWINGS

FIGS. 3A-3B illustrate a selective filter 300-A with horizontally embedded louvers, in accordance with one or more embodiments.

DETAILED DESCRIPTION

Figure 1A:
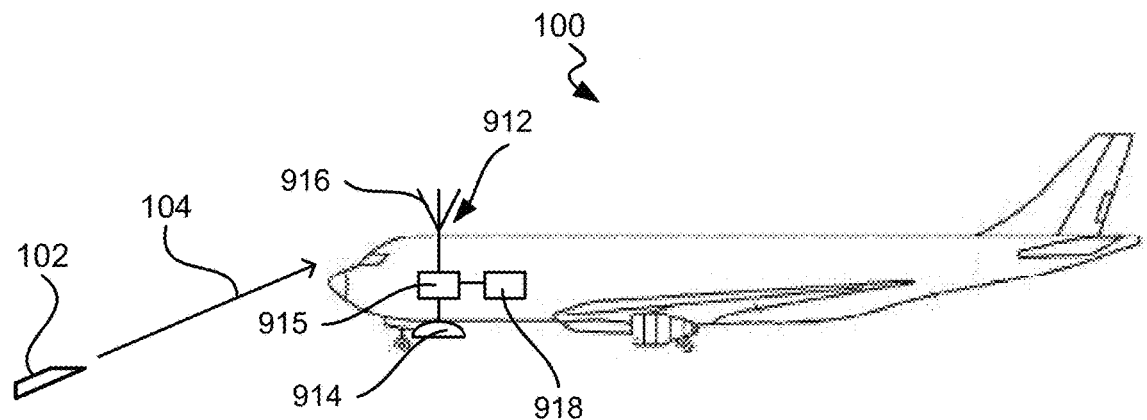
FIGS. 1A and 1B illustrate an example of an aircraft 100 that can be used in conjunction with the systems and mechanisms of the present disclosure in accordance with one or more embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aerial vehicles, such as aircraft. However, it should be noted that the techniques and mechanisms of the present disclosure apply to various other types of manned vehicles. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Introduction

The present disclosure describes a novel vision protection system against laser attacks on aircraft. The described systems and associated devices are configured to be worn by a user, such as a pilot of an aircraft. In some embodiments, the system comprises eyewear with a frame that may be worn across the user's forehead and secured at the ears and nose such that a viewing surface is in front of the user's eyes even with the prescription glasses, if any. A selective filter may be positioned adjacent to the viewing surface. In some embodiments, the selective filter comprises a light control film which restricts light approaching the viewing surface and/or selective filter at an angle of incidence greater than a cut off angle along an orthogonal plane.

In various embodiments, the light control film may comprise embedded louvers. Such louvers may be horizontal or vertical, which would restrict passage of light along a respective orthogonal plane. In some embodiments, the embedded louvers may be a combination of horizontal and vertical louvers arranged in a grid-like pattern in order to restrict passage of light along multiple orthogonal planes. In some embodiments, the viewing surface may comprise the selective filter itself formed of light control film. In other embodiments, the viewing surface may comprise integrated louvers comprising photochromic dye or color liquid crystals that activate when exposed to an electric signal.

The disclosed vision protection system may further comprise a light source identification system with a light detection module capable of detecting output from a light source. Depending on detection results, the light source identification system may transmit a signal to the vision protection system to operate between a first mode and a second mode. For example, the selective filter may be pivotably coupled to the frame. Upon detection of a light threat, a first signal may be transmitted to cause the selective filter to pivot and move adjacent to the viewing surface in the first mode in order to provide protection against incident light. However, if no light threat is detected, a second signal may be transmitted to cause the selective filter to pivot and move away from the viewing surface in the second mode in order provide unrestricted viewing angle to the user.

Although laser protection goggles are available, they are tuned for particular colors of light and would not be useful when different color lasers are used to shine at a pilot of an aircraft. When multiple layers of protection is added to protect against multiple frequencies, the optical density increases and restricts the clarity and color of vision. In such cases it may hinder the visibility of the guide lights on the runway path or road. Additionally, the windows may be coated with similar film for laser protection goggles, but would similarly become partially opaque resulting in poor vision at night time. The systems and apparatus described here are useful for restricting incident beams of all types and color of lasers and still gives reasonably clear frontal view of surroundings and color to navigate.

Example Embodiments

Figure 1B:
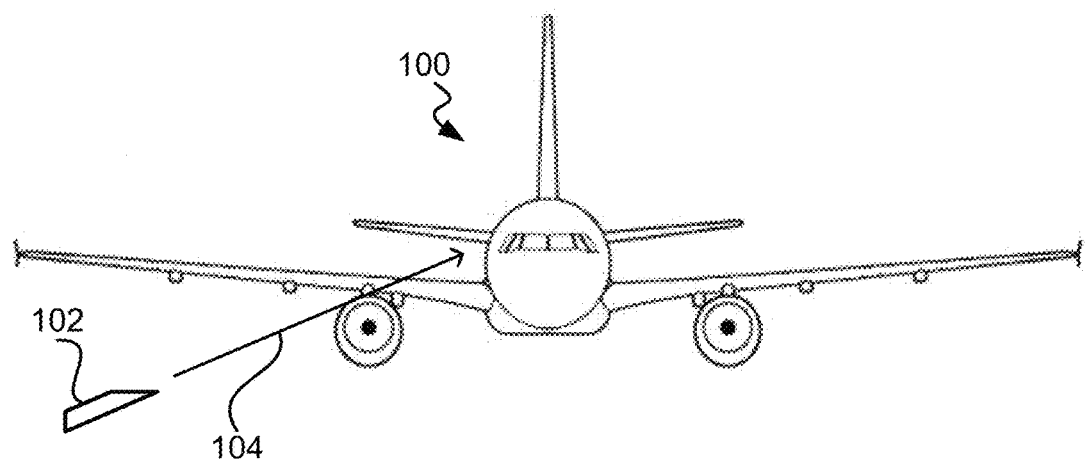

To better understand implementation of electromagnetic interference (EMI) filters in electrical systems, a brief description of an electrical system is now presented. FIGS. 1A and 1B illustrate an example of an aircraft 100 that can be used in conjunction with the systems and mechanisms of the present disclosure in accordance with one or more embodiments. FIG. 1A illustrates a side view of aircraft 100 while FIG. 1B illustrates a front view of aircraft 100. Aircraft 100 may be a passenger airplane, cargo airplane, helicopter, or any like aerial vehicle.

Aircraft 100 may be in any of various flight phases including, but not limited to: push back, taxi, takeoff, cruise, descent, final approach, or landing. A light source 102, such as a laser pointer or other laser device, may emit an output 104 (or beam of light) toward aircraft 100. In various other embodiments, laser source 102 may be any other device that emits a bright collimated light. Under certain conditions, laser light or other bright lights, such as spotlights or searchlights, directed at aircraft can be a hazard. Such bright visible laser light may cause distraction or temporary flash blindness to a pilot, during a critical phase of flight such landing or takeoff. It is also possible that a visible or invisible beam could cause permanent harm to a pilot's eyes. Searchlights and spotlights can also have the same dazzling, distracting, and flash-blinding effects.

As shown in FIG. 1A, the output 104 of light source 102 is directed upwards toward the cockpit of the aircraft 100 from the front. In FIG. 1B, the output 104 is directed upwards toward the cockpit from the side of aircraft 100. It should be understood that hazardous light beams may approach the aircraft at any various angles and directions.

Figure 2:
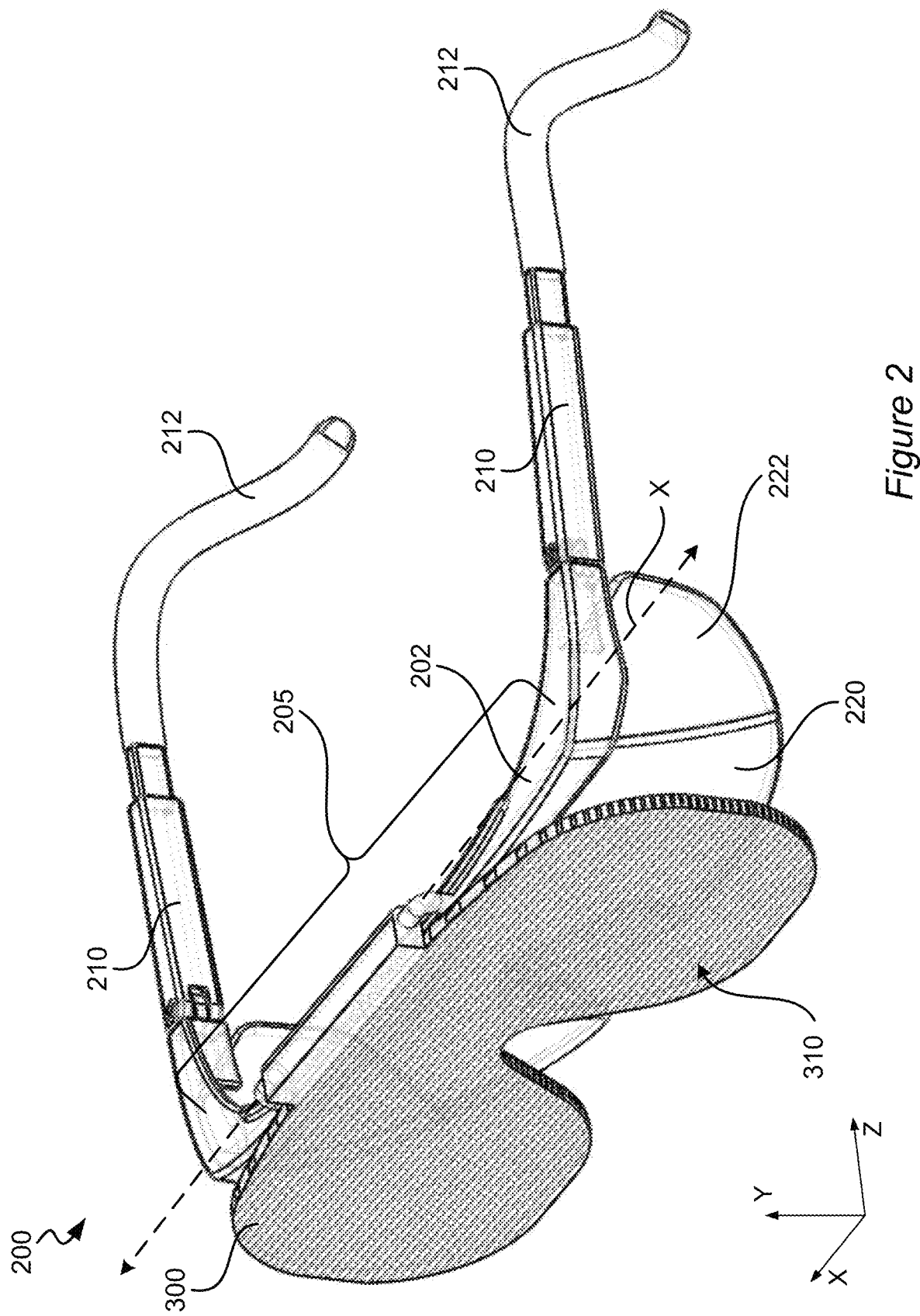
FIG. 2 illustrates a perspective view of a vision protection system 200 in accordance with one or more embodiments.

FIG. 2 illustrates a perspective view of a vision protection system 200 in accordance with one or more embodiments. The vision protection system 200 may be worn by a user across the face. In various embodiments, viewing protection system 200 comprises frame 202, which is configured to be positioned on the face of a user. Frame 202 may comprise a bridge portion 205 configured to extend across the forehead of the user. In some embodiments, two temple portions 210 may extend from each side of bridge portion 205, each temple portion ending with temple tip 212. Each temple portion 210 may extend across the user's temple toward an ear of the user with the temple tip 212 resting upon and partially hooking around the ear.

Vision protection system 200 may further comprise viewing surface 220. When system 200 is worn by the user, viewing surface 220 may be positioned in front of the user's eyes. In various embodiments, viewing surface 220 is transparent such that the user may see through viewing surface 220. In some embodiments, viewing surface 220 may be colored, tinted, polarized, and/or treated with various protective coatings such as to prevent glare. In some embodiments, viewing surface 220 may include a side panel 222 on each side that curves or bends or curves up to 90 degrees toward the temples of the user. In various embodiments, side panels 222 may or may not be transparent.

The frame 202 may further comprise a nasal support 204 configured to rest on the bridge of the user's nose. The nasal support 204 is shown in FIGS. 7B, 8B, and 8E. In some embodiments, nasal support 204 is a configuration of the shape of the viewing surface 220.

In various embodiments, vision protection system 200 may further comprise a selective filter 300. In some embodiments, selective filter 300 is arranged adjacent to the viewing surface. In some embodiments, the selective filter 300 comprises a light control film. As will be discussed below, with reference to selective filters 300-A and 300-B and 300-C, the selective filter regulates the angle of the field of view of the user in at least one orthogonal plane in order to prevent light transmitted from a light source, such as laser device 102, at a first location outside of the viewing angle from being viewed by the user. The described selective filters 300-A, 300-B, and 300-C described below may be selective filter 300 on vision protection system 200.

As stated above, in some embodiments the selective filter 300 comprises a light control film, which may be selected from a number of available materials, including, for example, VIKUITI™ light control films manufactured by 3M™ Optical Systems. These and similar light control films operate like a set of fixed louvers embedded in a structure such as, for example, a polycarbonate film. When placed over a display surface or image, the display or image appears unobstructed at normal incidence (viewing angle=0°; perpendicular to the light control film), but as the viewing angle increases along an orthogonal plane the amount of light transmitted through the film decreases until reaching a cutoff angle where the film blocks approximately all of the transmitted light.

Conversely, when placed over or adjacent to a viewing surface, light approaching at normal incidence (viewing angle=0°; perpendicular to the light control film), is viewable through the viewing surface and selective filter. However, light approaching the viewing surface at increasing incidence angles along an orthogonal plane will be partially blocked. In some embodiments, approximately all light approaching the viewing surface at an incidence angle at or beyond a cut off angle may be completely blocked by the selective filter 300.

FIGS. 3A-3B illustrate a selective filter 300-A with horizontally embedded louvers, in accordance with one or more embodiments. As shown in FIG. 3A, the horizontally embedded louvers 310-A run across along the X-axis. FIG. 3B illustrates a cross-sectional view of selective filter 300-A along the YZ plane.

Figure 4A:
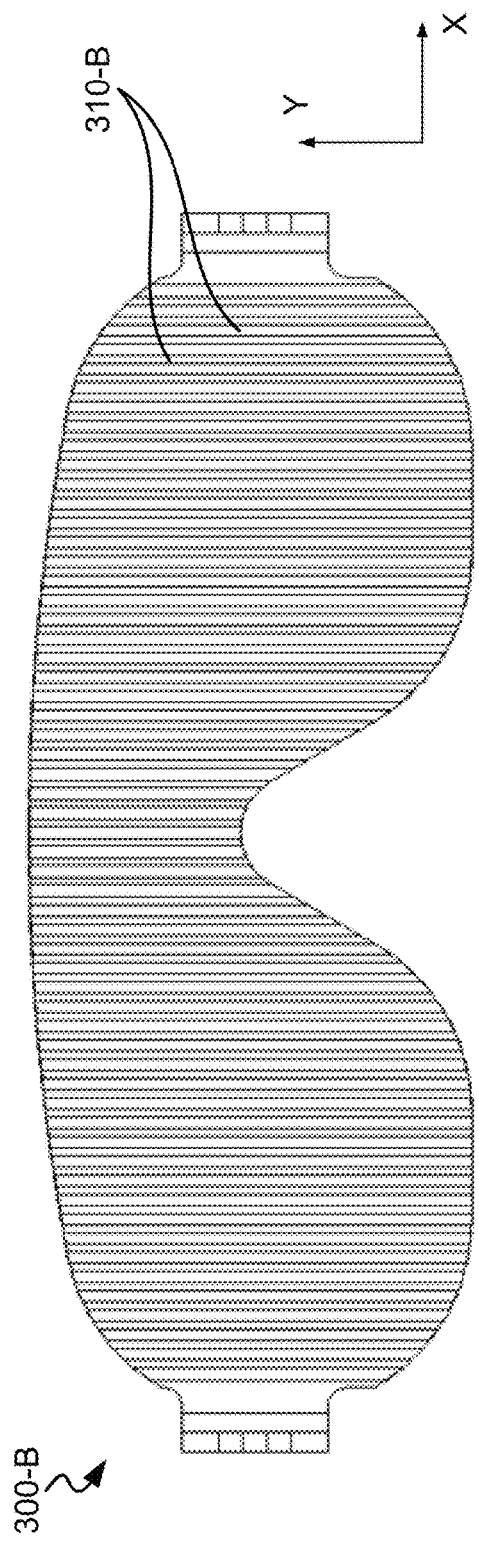
FIGS. 4A-4B illustrate a selective filter 300-B with vertically embedded louvers, in accordance with one or more embodiments.
Figure 4B:
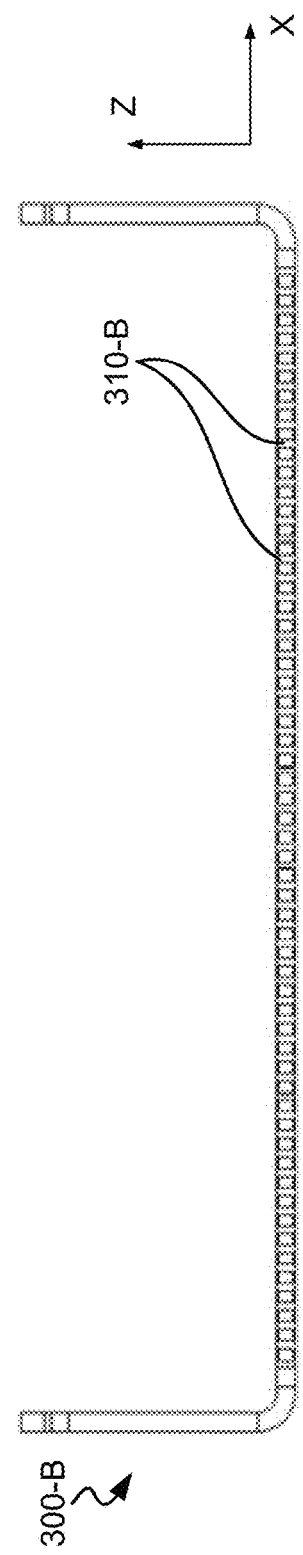

FIGS. 4A-4B illustrate a selective filter 300-B with vertically embedded louvers, in accordance with one or more embodiments. As shown in FIG. 4A, the vertically embedded louvers 310-B run across along the Y-axis. FIG. 4B illustrates a cross-sectional view of selective filter 300-B along the XZ plane.

Figure 5A:
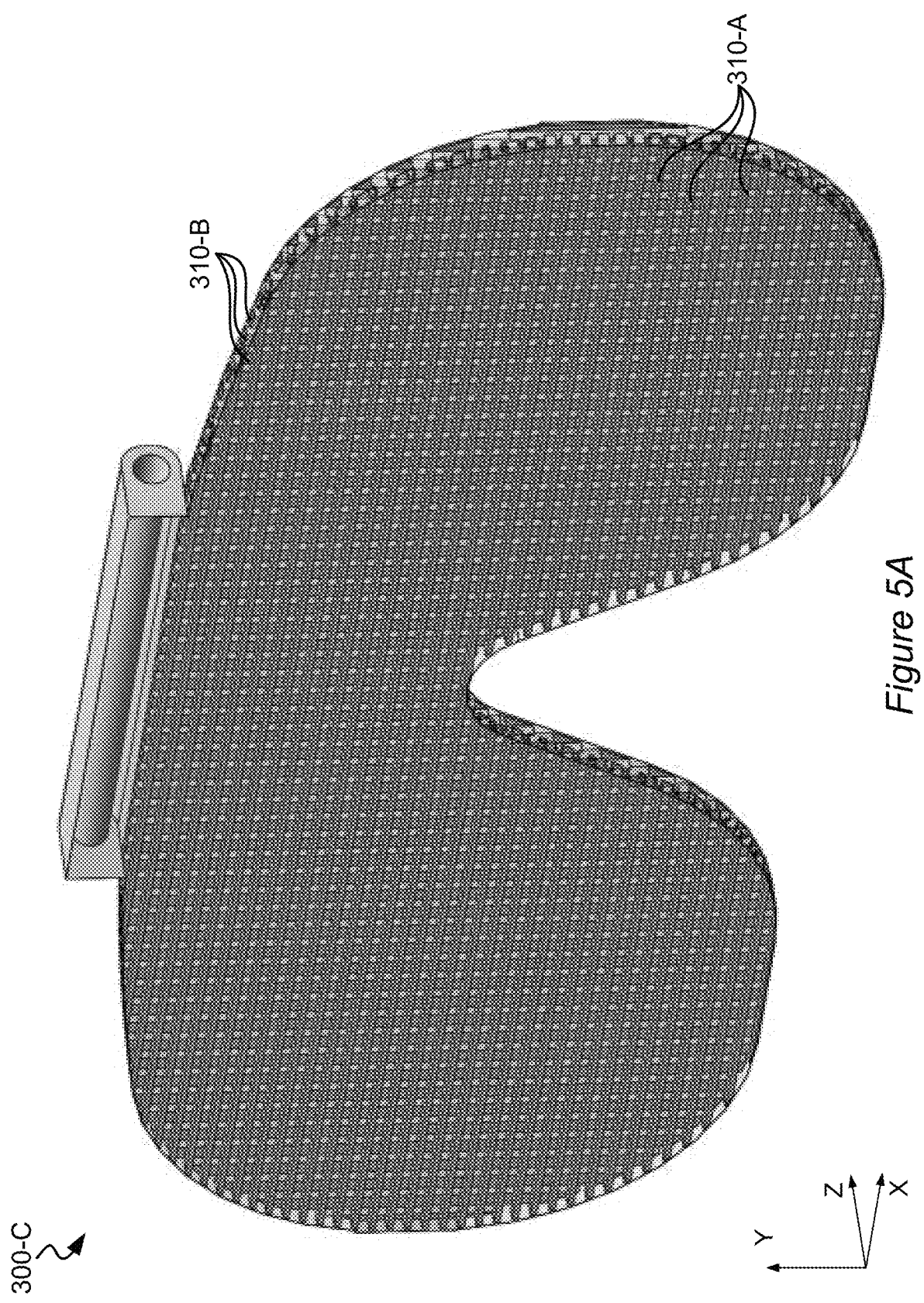
FIGS. 5A-5B illustrate a selective filter 300-C with horizontally and vertically embedded louvers arranged in a grid-like pattern, in accordance with one or more embodiments.
Figure 5B:
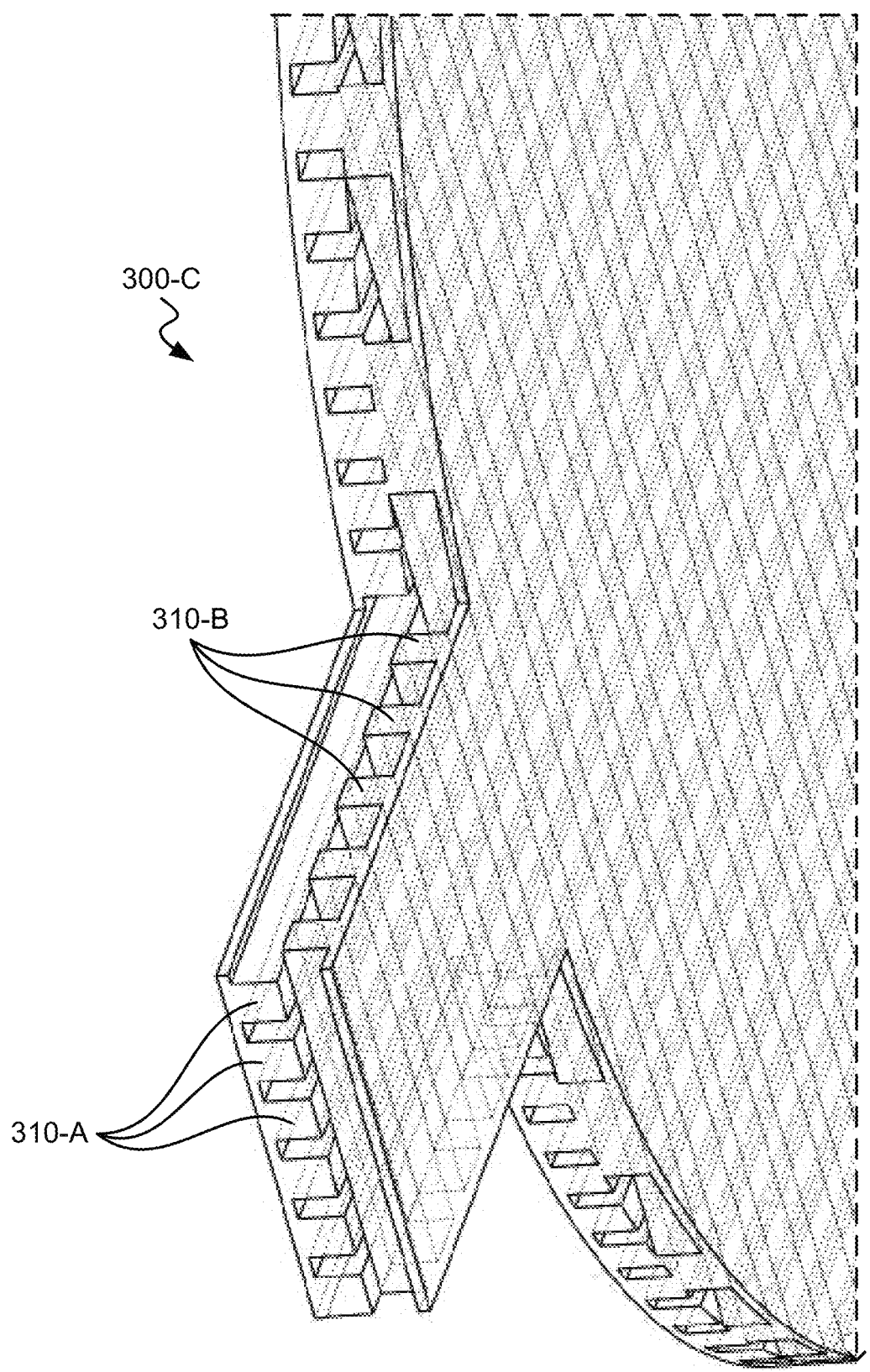

FIGS. 5A-5B illustrate a selective filter 300-C with horizontally and vertically embedded louvers arranged in a grid-like pattern, in accordance with one or more embodiments. As shown in FIG. 5A, the horizontally embedded louvers running across the X-axis and vertically embedded louvers 310-B running across along the Y-axis are overlaid. FIG. 5B illustrates an enlarged cross-sectional perspective view of selective filter 300-C along the XZ plane. The enlarged view in FIG. 5B shows a layer of horizontally embedded louvers 310-A stacked adjacently to a layer of vertically embedded louvers 310-B.

In some embodiments, the selective filter 300 is cut to a size and shape that approximates the size and shape of the viewing surface 220. This would limit any obstruction caused by the selective filter 300 when worn by the user. In some embodiments, the selective filter 300 is placed directly on the viewing surface 220 using an adhesive layer. In some embodiments, the viewing surface 220 itself may be selective filter 300 comprising light control film. In other embodiments, viewing surface 220 may include embedded louvers formed by layers comprising photochromic dyes or color changing liquid crystals. For example, the embedded louvers 310-A or 310-B may comprise rectangular strips that are filled with liquid crystals that convert to a darker color when exposed to an electric signal.

Figure 6:
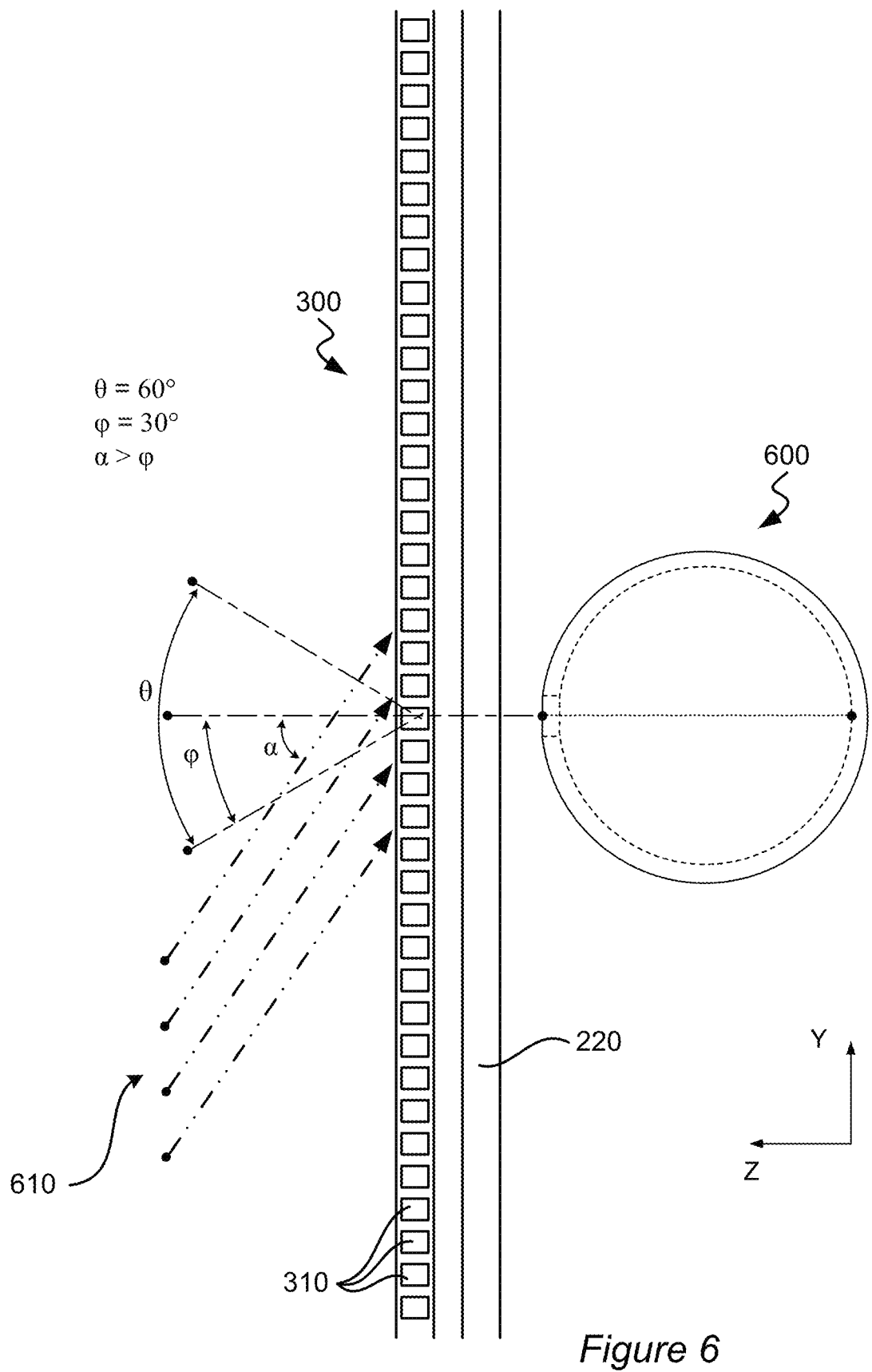
FIG. 6 illustrates the viewing angle restrictions of incident light 610 from an external source by a selective filter 300, in accordance with one or more embodiments.

The unobstructed vision angle of a human eye 600 in a normal plane is approximately 170 degrees. Light control films are designed to regulate light transmission to fall within or without a specific viewing angle θ. FIG. 6 illustrates the viewing angle restrictions of incident light 610 by a selective filter 300, in accordance with one or more embodiments. FIG. 6 illustrates a cross-sectional view of selective filter along the YZ plane corresponding to the cross-section of selective filter 300-A. However, the selective filter 300 in FIG. 6 may be a cross-section of any one of selective filters 300-A, 300-B, or 300-C.

As shown in FIG. 6, in some embodiments, the viewing angle θ of the light control film is approximately 60°; light approaching the light control film within in a 60° range, or within an angle φ of about ±30° is viewable by the user (plus or minus about) 30°, along orthogonal plane XZ. At the normal incidence N, perpendicular to the selective filter 300, light may pass through to the user's eye 600 without obstruction through the selective filter. Light approaching the selective filter 300 outside of the viewing angle θ, however, may be blocked by at least 95% of the maximum light transmitted in the normal direction N.

Thus, a vision protection system 200 with horizontally configured embedded louvers 310-A may be able to restrict light approaching the aircraft at an incidence angle of about 30° below or above the aircraft. A vision protection system 200 with vertically configured embedded louvers 310-B may be able to restrict light approaching the aircraft at an incidence angle of about 30° to the right or left of the aircraft. A vision protection system 200 with both horizontally and vertically configured embedded louvers may be able to restrict light approaching the aircraft at an incidence angle of about 30° above, below, to the right, and to the left of the aircraft. In various embodiments, during use of the vision protection system 200, the user may move his or her head to shift the viewing angle in order to further tune out any interfering light that may initially be transmitted through the selective filter.

Light control films are also commonly designed with a viewing angle of 48°. Many other trajectory ranges are possible, and some embodiments of the present disclosure contemplate viewing angles of about 40° to about 60°, though some embodiments may require other viewing angles to receive consideration. The chosen viewing angle for some embodiments may, for example, be selected to consider the minimum safe field of view for operation of an aircraft during various flight phases.

As discussed above, light control films are generally constructed to regulate the passage of light through the selective filter along a plane that is orthogonal to the selective filter or viewing surface 220. In alternative embodiments, however, the light control film may be constructed to regulate transmission of light in multiple planes. For example, a light control film could be constructed that would allow incident light outside a range of about 48° to be blocked, within a first plane that is orthogonal to the display surface 220, and outside a range of about 60° along a second plane that is orthogonal to both the viewing surface 220 and the first plane. For example, selective filter 300-C with two perpendicular layers of embedded louvers 310-A and 310-B may be configured to block light with an angle of incidence beyond a cut off angle in the YZ plane, as well as light with an angle of incidence beyond a cut off angle in the XZ plane. It may also be possible to define the viewing angle in terms of a polar coordinate system or other coordinate system.

As such, light may be restricted outside of a cut off angle along various different orthogonal planes relative the selective filter based on the configuration of embedded louvers. It should be understood that various combinations of configurations for embedded louvers may be implemented.

Figure 7A:
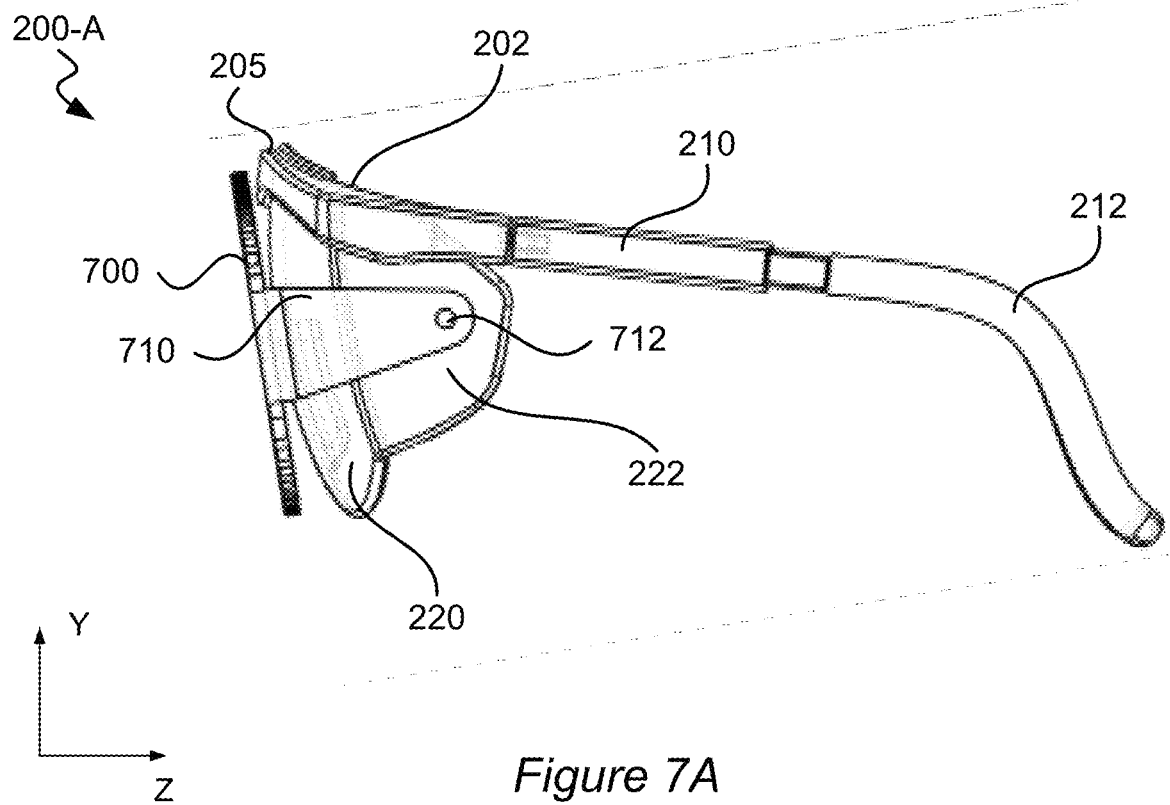
FIGS. 7A-7C illustrate an example vision protection system 200-A in accordance with one or more embodiments.
Figure 7B:
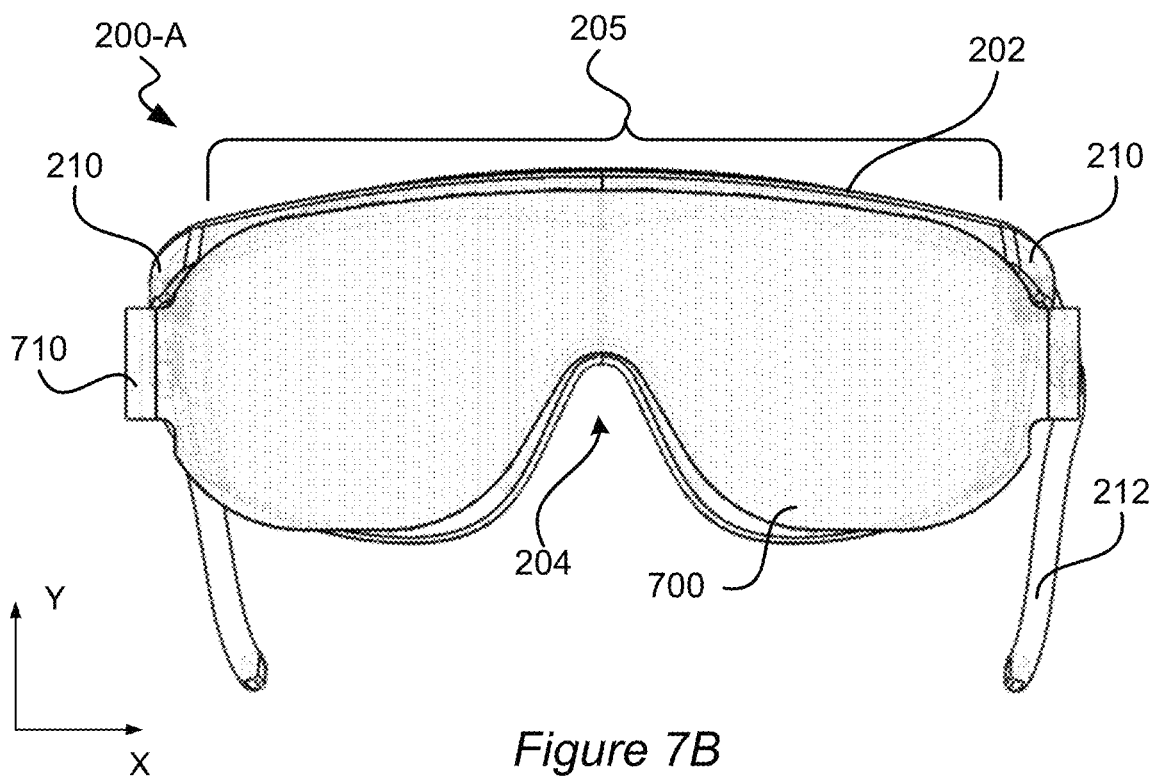
Figure 7C:
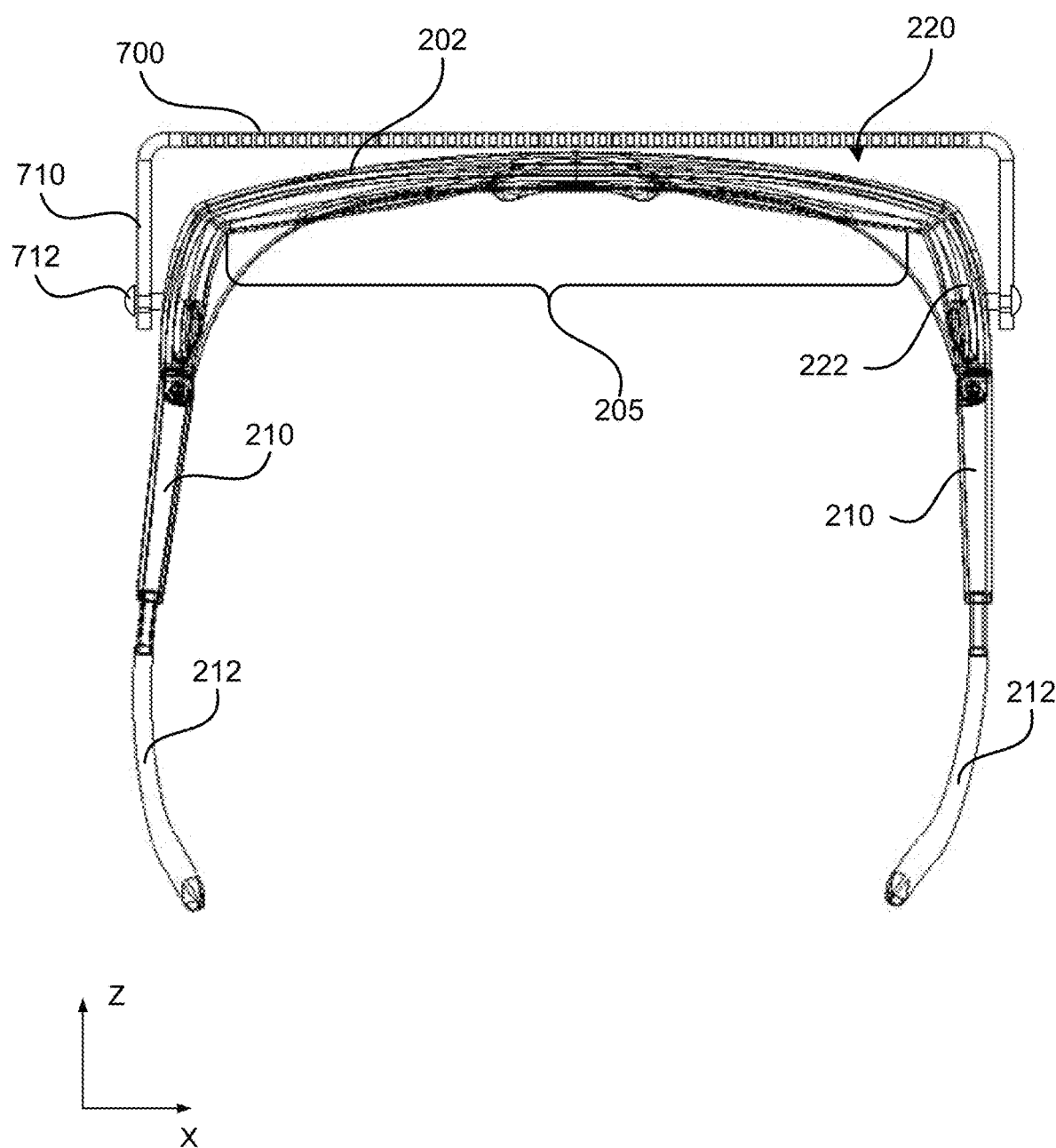

FIGS. 7A-7C illustrate an example vision protection system 200-A in accordance with one or more embodiments. FIG. 7A illustrates a side view of vision protection system 200-A, FIG. 7B illustrates a front view of vision protection system 200-A, and FIG. 7C illustrates a top view of vision protection system 200-A. In some embodiments, system 200-A may be system 200 previously described with reference to FIG. 2. System 200-A includes selective filter 700. Selective filter 700 may be any one of selective filters 300-A, 300-B, or 300-C with horizontal, vertical, or a combination of embedded louvers, respectively.

In various embodiments, selective filter 700 is coupled to protection system 200 via attachment panel 710. In some embodiments, attachment panel 710 may be an integral part of selective filter 700. In some embodiments, at least a portion of attachment panel 710 may comprise the same material as selective filter 700 including embedded louvers. However, in other embodiments, attachment panel 710 may be a separate component that is coupled to selective filter 700 using various other attachment means, such as adhesives, welding, or other mechanical means, etc. In various embodiments, attachment panel 710 is coupled to side panel 222 of viewing surface 220. As shown, attachment panel 710 is attached to side panel 222 via fastener 712. However, in some embodiments, attachment panel 710 may be attached to side panel 222 via various other attachment means, such as adhesives, welding, or other mechanical means, etc. In yet other embodiments, attachment panel may be attached to one or more various portions of frame 202.

Figure 8A:
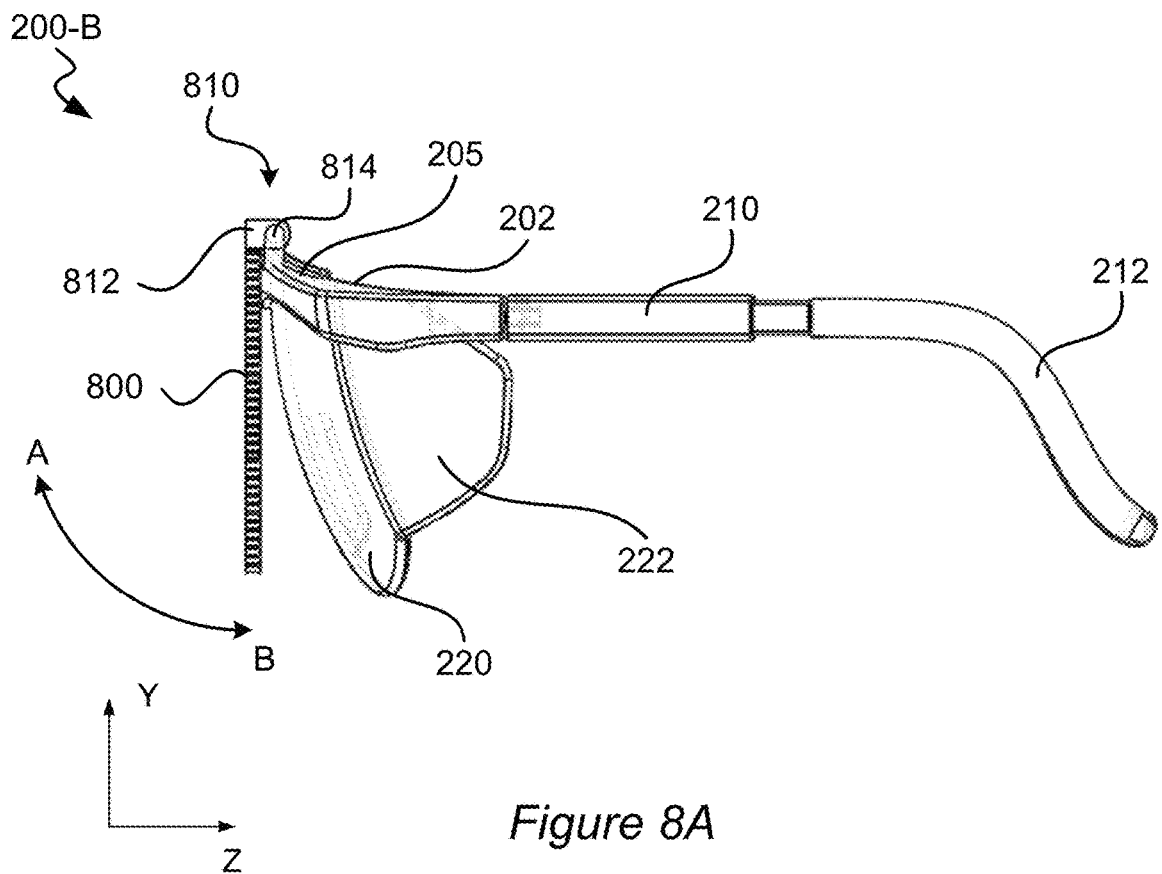
FIGS. 8A-8F illustrate another example vision protection system 200-B with a pivoting selective filter, in accordance with one or more embodiments.
Figure 8B:
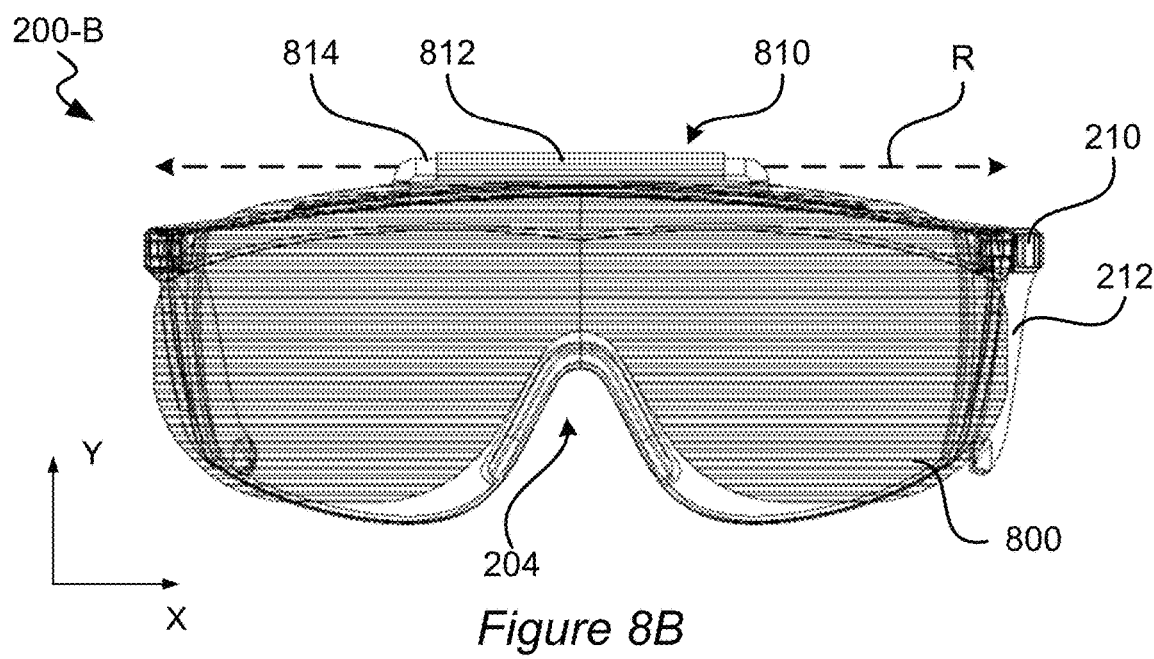
Figure 8C:
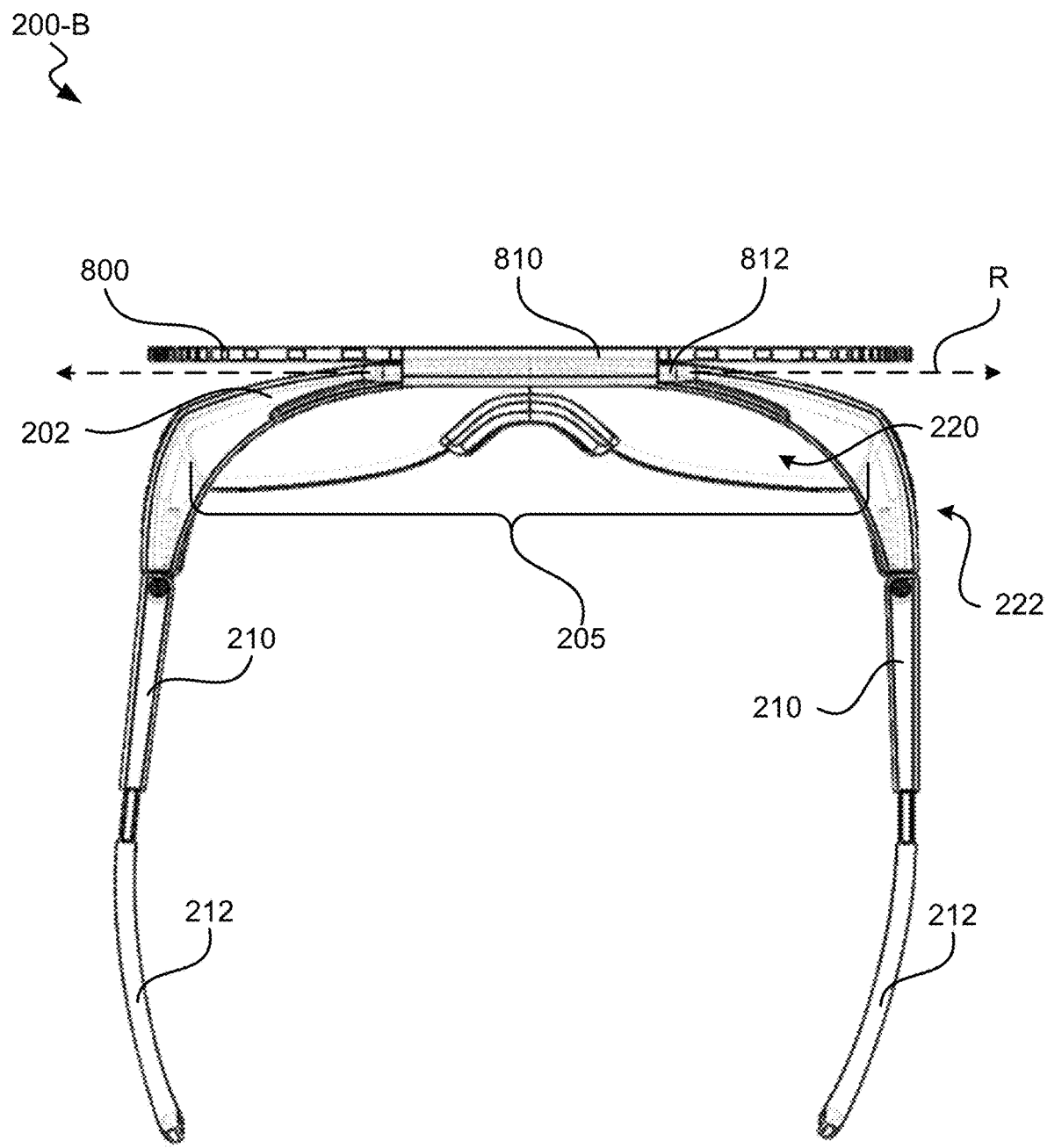
Figure 8D:
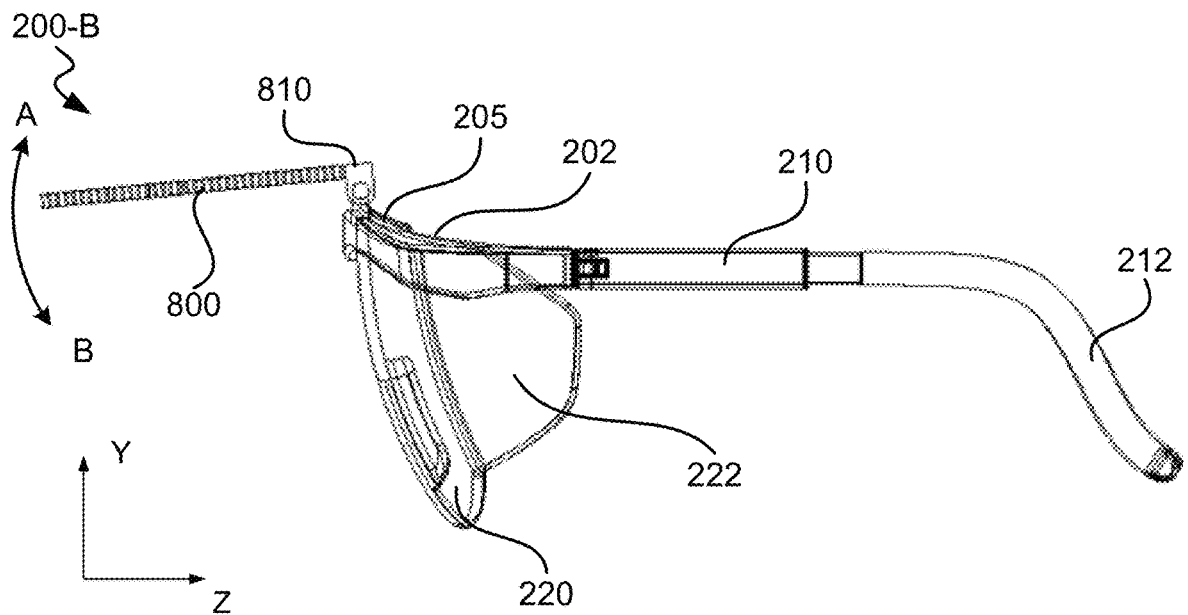
Figure 8E:
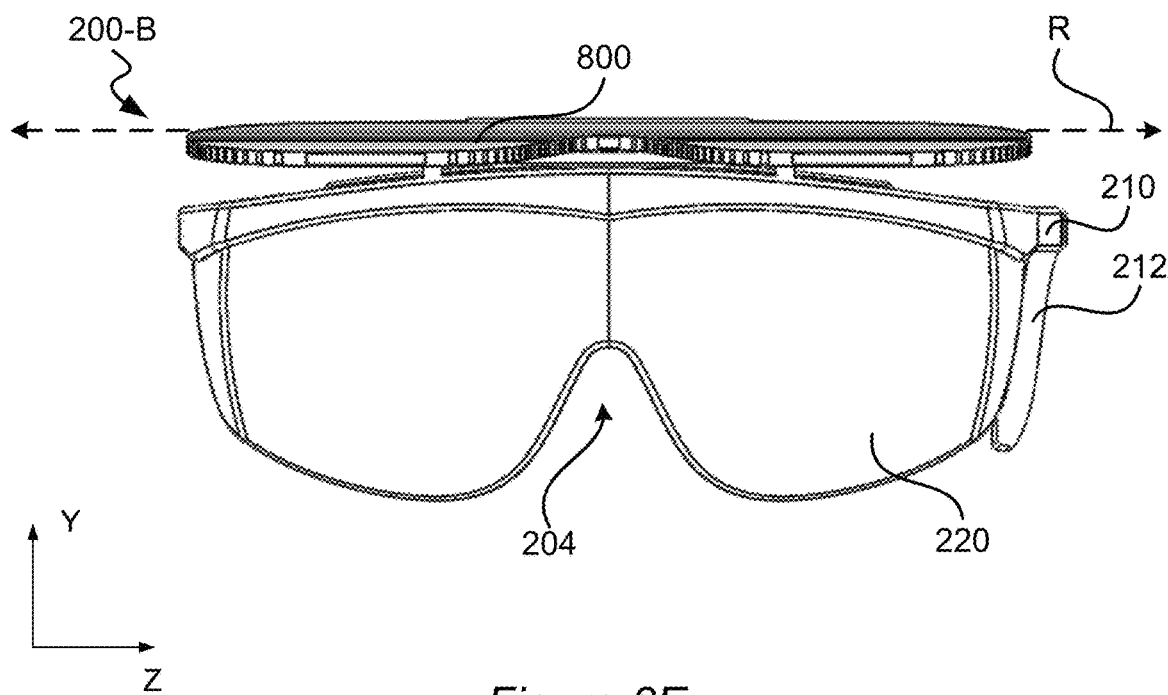
Figure 8F:
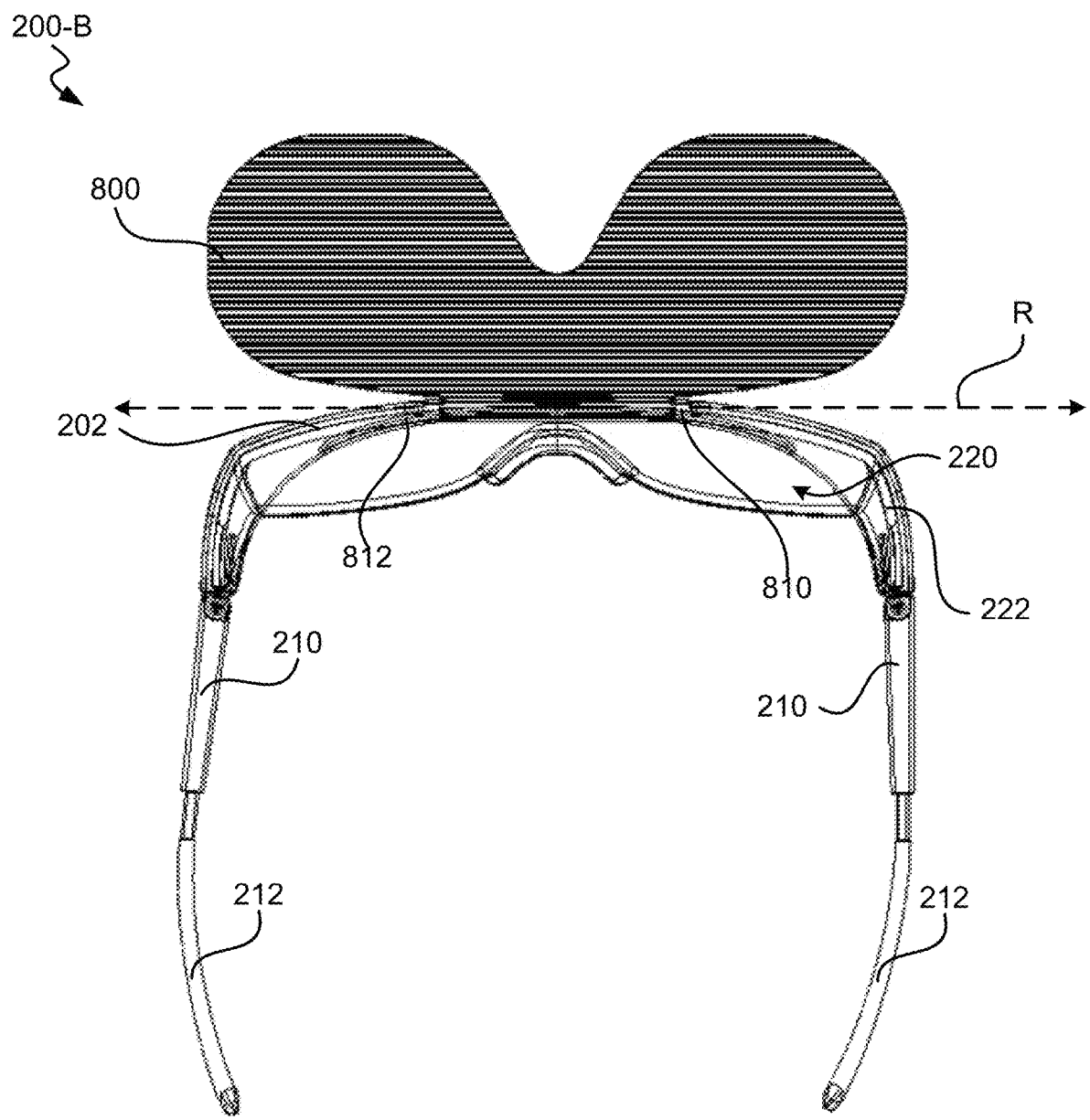

FIGS. 8A-8F illustrate another example vision protection system 200-B with a pivoting selective filter, in accordance with one or more embodiments. FIGS. 8A-8C show various views of vision protection system 800 in a first mode, or protection mode, while FIGS. 8D-F show various views of vision protection system 800 in a second mode, or exposed mode. FIGS. 8A and 8D illustrate a side view of vision protection system 200-B, FIGS. 8B and 8E illustrate a front view of vision protection system 200-B, and FIGS. 8C and 8F illustrate a top view of vision protection system 200-B.

In some embodiments, system 200-B may be system 200 previously described with reference to FIG. 2. System 200-B includes selective filter 800. Selective filter 800 may be any one of selective filters 300-A, 300-B, or 300-C with horizontal, vertical, or a combination of embedded louvers, respectively. As shown, selective filter 800 includes a hinge mechanism 810 that comprises an attachment portion 812 of selective filter 800 and a rotatable structure 814 fixed to the bridge portion 205.

In various embodiments, attachment portion 812 may be a barrel like structure and the rotatable structure 814 may be pin like structure to form the hinge mechanism 810. However, in some embodiments, the rotatable structure 814 may be a barrel like structure and that attachment portion 812 may be a pin like structure such that the rotatable structure 824 pivotably supports the attachment portion 812 to form hinge mechanism 810.

In various embodiments, hinge mechanism 810 allows selective filter 800 to rotate about an axis R in direction of arrows A and B from a first mode to a second mode. In some embodiments, the first mode may be a configuration in which selective filter 800 is positioned adjacent to viewing surface 220. As shown in FIGS. 8A and 8C, selective filter 800 may have a relatively flat surface structure while viewing surface 220 may include a curved surface. However, in some embodiments, selective filter 800 may also be formed to include a curved surface to correspond with the shape of the surface of viewing surface 220.

In some embodiments, the second mode may be a configuration in which selective filter 800 is positioned away from viewing surface 220. As shown in FIGS. 8D-8F, selective filter 800 is rotated to a position that is substantially perpendicular to the position of the selective filter 800 in the first mode, allowing a completely unobstructed view through viewing surface 220. In some embodiments, selective filter 800 may be moved further in direction of arrow A.

In some embodiments, hinge mechanism 810 may include one or more motors or solenoids to automatically rotate selective filter 800 about the axis R. Various motors may be implemented in different embodiments, such as a DC motor, a servo motor, a stepper motor, etc. In such embodiments, hinge mechanism may be activated remotely via transmission of a wireless signal.

In some embodiments, vision protection systems, as contemplated herein, further comprise a detection module for detecting an output of light from a light source, such as laser device 102. As such, an aircraft equipped with vision protection system 200, such as aircraft 100, may detect output 104 from light source 102.

Figure 9:
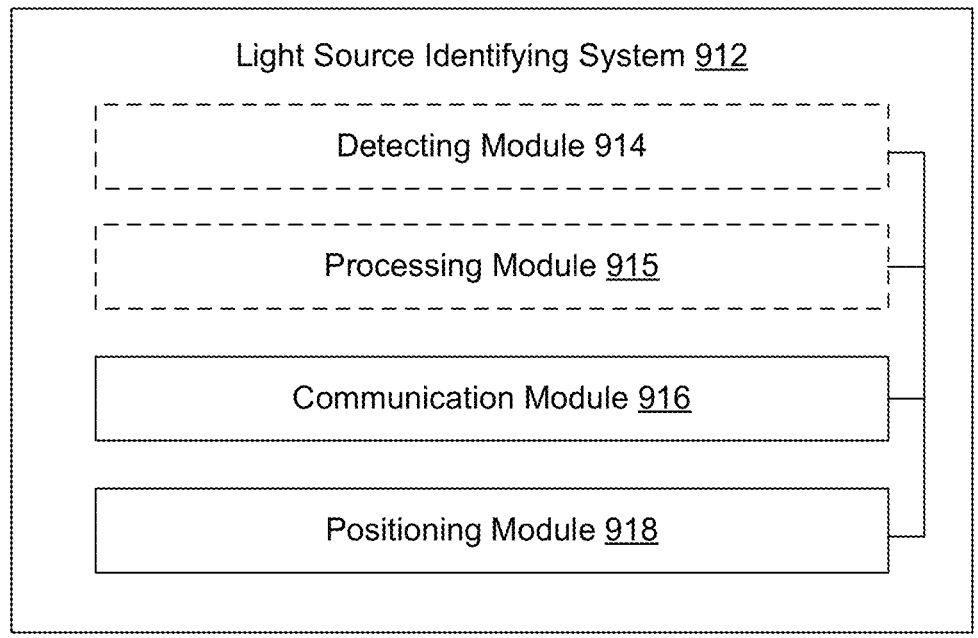
FIG. 9 is a schematic representation of a system for identification of a light source, in accordance with one or more embodiments.

With reference to FIG. 1, aircraft 100 may include light source identification system 912 for identifying location of light source 102. In some embodiments, aircraft 100 includes some (but not all) components of light source identification system 912. Other components may be positioned on other nodes, such as other aircraft (airborne nodes) or ground based nodes. Similar light source identifying systems may be positioned on other aircraft and/or ground based nodes. Light source identification system 912 may include detecting module 914, processing module 915, communication module 916, and positioning module 918 as shown in FIG. 9. Some of these components may be components (e.g., specifically configured or adapted components) of other systems, such as avionics of aircraft 100. Each of these components will now be described in more detail. In some embodiments, functions of detecting module 914 may be performed by a user. For example, a pilot may detect the light source output and determine relative position of the light source to the aircraft. As such, detecting module 914 may be absent from light source identification system 912.

Detecting module 914 is used for detecting output 104 from light source 102. Output 104 (e.g., a laser beam) does not necessarily need to reach detecting module 914. Output 104 directed at another aircraft may be still detected by detecting module 914. For example, the light beam may be visible from a distance due to scattering from dust particles or water droplets along the beam path. Higher-power and higher-frequency green or blue lasers may produce a beam visible even in clean air because of Rayleigh scattering from air molecules, especially when viewed in dimly lit conditions (e.g., evening or night). Detecting module 914 may be a camera or any other device capable of detecting a high intensity light output. For example, a camera attached to the bottom portion of aircraft's airframe may be used as detecting module 914.

Detecting module 914 may be part of another aircraft system and may include the ability to receive input from pilots as to a location of a light source. For example, a camera that is a part of a ground maneuver camera system (GMCS) of aircraft 100 may be used or adapted for use as detecting module 914. Conventional uses of a GMCS including providing pilots with real-time views of the landing gear (e.g., deployment status), ground conditions, and proximity to the pavement edge during taxi maneuvers. One or more cameras of the GMCS may be mounted behind the nose gear and/or in leading edges of the horizontal stabilizer. The GMCS camera used as detecting module 914 does not need to display images captured by the camera to the pilots. Instead, these images may be processed by the camera or sent to processing module 915 for detecting output 104 of light source 102. For example, one or more images captured by the camera may be analyzed for light intensity. If the light intensity exceeds a certain threshold (e.g., in a portion of the image), then this portion is deemed to represent output 104 of light source 102. In some embodiments, the location of this portion on the image may be used to determine relative position of light source 102 to aircraft 100. This relative position or the entire image may be included into a first data set sent to processing module 915 and/or, in some embodiments, transmitted to a ground based node.

The orientation of detecting module 914 relative to aircraft 100 may be fixed. Alternatively, detecting module 914 may be movable (e.g., pivotable) with respect to aircraft 100. For example, detecting module 914 may rotate in order to scan a larger area. In some embodiments, output 104 from light source 102 is detected at two or more different orientations of detecting module 914. These different orientations may be used to more precisely determine relative position of light source 102 to aircraft 100. Furthermore, the initial detection of output 104 from light source 102 may be used to change the orientation of detecting module 914.

Detecting module 914 may be communicatively coupled to processing module 915 and configured to provide the first data set to processing module 915. As noted above, the first data set includes relative position of light source 102 to aircraft 100. Alternatively, detecting module 914 may be communicatively coupled to communication module 916 and configured to provide the first data set to communication module 916. Communication module 916 may then transmit this data set to another node.

In various embodiments, detecting module 914 may be communicatively connected to the hinge mechanism 810 in order to transmit control signal configured to operate hinge mechanism 810. For example, if no light output beam 104 is detected, detecting module 914 may transmit a clear signal to hinge mechanism 810 to cause automatic rotation of selective filter 800 in the direction of arrow A and into a position that is not adjacent to viewing surface 220, as depicted in the second mode of FIGS. 8D-8F. If the selective filter is already in the second mode, the clear signal may be ignored, or function to maintain the operation of hinge mechanism 810 in the second mode. In some embodiments, the clear signal may be transmitted if detected light output 104 is below a predetermined intensity threshold, which has been determined not to be a threat hazard to aircraft operation.

In some embodiments, upon detecting an output beam 104 above a predetermined intensity, light source identification system 912 may transmit a laser threat signal to the hinge mechanism of vision protection system 200-B to cause automatic rotation of selective filter 800 in the direction of arrow B and in a position that is adjacent to viewing surface 220, as depicted in the first mode of FIGS. 8A-8C. If the selective filter is already in the first mode, the laser threat signal may be ignored, or function to maintain the operation of hinge mechanism 810 in the first mode.

In some embodiments, the laser threat signal may be transmitted only when a light output 800 that reaches the detection module 914 is detected. In some embodiments, the laser threat signal may be transmitted even if the light output does not reach detection module 914 or aircraft 100. As such, the user wearing vision protection system 200-B will be protected from potential light outputs that may hinder ability to operate aircraft 100.

In various embodiments, if no light output 104 is detected by detection module 914 for a predetermined minimum length of time, system 912 may transmit or retransmit the clear signal to hinge mechanism 810 to cause automatic rotation of selective filter 800 in the direction of arrow A and in a position that is not adjacent to viewing surface 220, such as that shown in FIGS. 8D-8F, and allowing full unobstructed viewing angles for the user.

In some embodiments, the signals may be transmitted wirelessly from detection module 914 to hinge mechanism 810. In other embodiments, the signals may be transmitted via a direct wired connection. In some embodiments, the signals may be transmitted from the detection module 914 to hinge mechanism 810 via processing module 915.

In some embodiments, in which the embedded louvers are integrated within the viewing surface 220, the laser threat signal may cause the vision protection system to operate in the first mode by activating the embedded louvers comprising color liquid crystals to provide protection against light with incidence angles above a cut off range. In such embodiments, the clear signal may cause the vision protection system to operate in the second mode by deactivating the embedded louvers to provide an unobstructed viewing angle through viewing surface 220.

Positioning module 918 may be used to estimate aircraft location or, more specifically, to estimate aircraft location at the time of detecting output 104 from light source 102. Positioning module 918 may be a GPS sensor, inertial navigation system (INS) sensor, or any other like sensor. Positioning module 918 may be communicatively coupled to processing module 915 and configured to provide the second data set to processing module 915. The second data set includes the aircraft location at the time of detecting output 104 from light source 102. Alternatively, positioning module 918 may be communicatively coupled to communication module 916 and configured to provide the first data set to communication module 916. Communication module 916 may then transmit this second data set to another node.

Processing module 915 is an optional module of light source identification system 912 as shown in FIG. 9. Processing module 915 may be used to collectively analyze the first data set and the second data set and to generate an estimate of the location of the light source. If present, processing module 915 may be communicatively coupled to positioning module 918, detecting module 914, and communication module 916. Alternatively, processing of the first data set and the second data set maybe performed by another node. In this case, the first data set and the second data set are transmitted to this other node.

Processing module 915 and/or, in some embodiments, positioning module 918 and detecting module 914 may be communicatively coupled to communicating module 916. Communicating module 116 may be an Aircraft Communications Addressing and Reporting System (ACARS), such as an air-band radio ACARS or a satellite ACARS. Communicating module 916 may be configured to transmit light source location estimate and/or various data sets to other nodes, such as other airborne nodes and/or ground based nodes. These other nodes may be also equipped with similar communicating modules. In some embodiments, communicating module 916 is configured to transmit to another aircraft, air traffic control unit, AOC, and/or ground based law enforcement unit. One having ordinary skills in the art would understand that any number of ground based nodes and any number of airborne nodes can receive transmission from aircraft 100.

Because the risk of laser attacks is greatest when they occur during critical phases of flight with high workload, such as takeoff, approach, landing, and critical or emergency maneuvers, vision protection system 200 may be in an operational mode only during such critical phases, and in a restricted mode when the aircraft is operating in other flight phases. For example, the vision protection system 200 may operate in a landing mode during the landing phase. While in the landing mode, the vision protection system 200 configured with a selective filter may be rotated between the first mode and the second mode in response to signals transmitted from the light source identification system 912. However, while in the restricted mode, the selective filter cannot be rotated between the first mode and the second mode, even if a laser threat signal is transmitted form the light source identification system 912.

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A vision protection system for defense against laser threats, the vision protection system comprising:
   a viewing device having a frame supporting a transparent viewing surface, wherein the frame is configured to be positioned on a face of a user such that the user sees through the viewing surface; and
   a selective filter separate from the frame and positioned adjacent to the viewing surface such that light is transmitted through the selective filter to the user, wherein the selective filter comprises a set of louvers arranged in a direction, wherein the set of louvers is embedded within the selective filter and lie flush against a front surface or a back surface of the selective filter;
   wherein the set of louvers regulates a viewing angle of the user in at least one orthogonal plane, the at least one orthogonal plane being orthogonal to the viewing surface, the viewing angle having been selected to prevent light transmitted from a light source from being viewed by the user, wherein the light source is located outside of the viewing angle.

2. The vision protection system of claim 1, wherein the set of louvers comprise rectangular strips filled with one or more of a photochromic dye or color changing liquid crystals.

3. The vision protection system of claim 1, wherein the user is a pilot operating an aircraft.

4. The vision protection system of claim 3, wherein the selective filter is pivotably coupled to the frame via a hinge mechanism such that the hinge mechanism is configured to alternate between:

a first position in which the selective filter is positioned adjacent the viewing surface, and a second position in which the selective filter is not positioned adjacent to the viewing surface.

5. The vision protection system of claim 4 further comprising a detection module for detecting an output from the light source, wherein the light source is positioned outside of the aircraft;

wherein detecting the output from the light source generates a first signal that is transmitted to the hinge mechanism to move into the first position; and wherein detecting no output from the light source generates a second signal that is transmitted to the hinge mechanism to move into the second position.

6. The vision protection system of claim 5, wherein the vision protection system operates in a restricted mode and a landing mode corresponding to a landing phase of operation of the aircraft;

wherein in the restricted mode, the hinge mechanism remains in the second position; and wherein in the landing mode, the hinge mechanism is alternates between the first position and the second position.

7. The vision protection system of claim 1, wherein the selective filter comprises a light control film having mechanical louvers.

8. The vision protection system of claim 1, wherein the viewing angle is between about 40° and about 60°.

9. An aircraft comprising a viewing protection system for defense against laser threats, the viewing protection system comprising:

a viewing device having a frame supporting a transparent viewing surface, wherein the frame is configured to be positioned on a face of a user such that the user sees through the viewing surface; and a selective filter separate from the frame and positioned adjacent to the viewing surface such that light is transmitted through the selective filter to the user, wherein the selective filter comprises a set of louvers arranged in a direction, wherein the set of louvers is embedded within the selective filter and lie flush against a front surface or a back surface of the selective filter;

wherein the set of louvers regulates a viewing angle of the user in at least one orthogonal plane, the at least one orthogonal plane being orthogonal to the viewing surface, the viewing angle having been selected to prevent light transmitted from a light source from being viewed by the user, wherein the light source is located outside of the viewing angle.

10. The aircraft of claim 9, wherein the set of louvers comprise rectangular strips filled with one or more of a photochromic dye or color changing liquid crystals.

11. The aircraft of claim 9, wherein the selective filter is pivotably coupled to the frame via a hinge mechanism such that the hinge mechanism is configured to alternate between:

a first position in which the selective filter is positioned adjacent to the viewing surface, and and a second position in which the selective filter is not positioned adjacent to the viewing surface.

12. The aircraft of claim 11 further comprising a detection module for detecting an output from the light source, wherein the light source is positioned outside of the aircraft;

wherein detecting the output from the light source generates a first signal that is transmitted to the hinge mechanism to move into the first position; and wherein detecting no output from the light source generates a second signal that is transmitted to the hinge mechanism to move into the second position.

13. The aircraft of claim 12, wherein the viewing protection system operates in a restricted mode and a landing mode corresponding to a landing phase of operation of the aircraft;

wherein in the restricted mode, the hinge mechanism remains in the second position; and wherein in the landing mode, the hinge mechanism alternates between the first position and the second position.

14. The aircraft of claim 9, wherein the selective filter is a light cover having mechanical louvers.

15. The aircraft of claim 9, wherein the viewing angle is between about 40° and about 60°.

16. A vision protection system for defense against laser threats, the vision protection system comprising:

a viewing device having a frame supporting a viewing surface, wherein the frame is configured to be positioned on a face of a user such that the user sees through the viewing surface;

wherein the viewing surface comprises a selective filter such that light is transmitted through the selective filter to the user, wherein the selective filter comprises a set of louvers arranged in a direction, wherein the set of louvers is embedded within the selective filter and lie flush against a front surface or a back surface of the selective filter; and wherein the set of louvers regulates a viewing angle of the user in at least one orthogonal plane, the at least one orthogonal plane being orthogonal to the viewing surface, the viewing angle having been selected to prevent light transmitted from a light source from being viewed by the user, wherein the light source is located outside of the viewing angle.

17. The vision protection system of claim 16, wherein the set of louvers comprise rectangular strips filled with one or more of a photochromic dye or color changing liquid crystals.

18. The vision protection system of claim 17, wherein the user is a pilot operating an aircraft.

19. The vision protection system of claim 16, wherein the selective filter is a light cover having mechanical louvers.

20. The vision protection system of claim 16, wherein the viewing angle is between about 40° and about 60°.

* * * * *